(12) United States Patent
Mican et al.

(10) Patent No.: US 12,363,016 B2
(45) Date of Patent: Jul. 15, 2025

(54) TECHNIQUES FOR DISCOUNTING EXTENSIBILITY LATENCY

(71) Applicant: Okta, Inc., San Francisco, CA (US)

(72) Inventors: Daniel Justin Mican, Sykesville, MD (US); Damian Andres Fortuna, Rosario (AR); Germán Gastón Lena, Buenos Aires (AR); Luís Garrido Henriques de Miranda, Lisbon (PT)

(*) Notice: Subject to any disclaimer, the term of this patent is extended or adjusted under 35 U.S.C. 154(b) by 405 days.

(21) Appl. No.: 17/816,181

(22) Filed: Jul. 29, 2022

(65) Prior Publication Data

US 2024/0039818 A1 Feb. 1, 2024

(51) Int. Cl.
*H04L 43/0864* (2022.01)
*H04L 43/10* (2022.01)

(52) U.S. Cl.
CPC .......... *H04L 43/0864* (2013.01); *H04L 43/10* (2013.01)

(58) Field of Classification Search
CPC .............................. H04L 43/0864; H04L 43/10
See application file for complete search history.

(56) References Cited

U.S. PATENT DOCUMENTS

| 7,685,270 B1* | 3/2010 | Vermeulen .......... H04L 41/5083 |
| | | 710/36 |
| 11,606,267 B1* | 3/2023 | Kotipalli ................. H04L 43/04 |
| 2015/0134827 A1* | 5/2015 | Shah ................... H04L 67/1095 |
| | | 709/226 |
| 2018/0063018 A1* | 3/2018 | Bosch ................... H04L 47/822 |

* cited by examiner

*Primary Examiner* — Emmanuel L Moise
*Assistant Examiner* — Xiang Yu
(74) *Attorney, Agent, or Firm* — Holland & Hart LLP

(57) ABSTRACT

Methods, systems, and devices for discounting extensibility latency are described. A first service platform may receive, from a user via a client device, a first request to access extensible resources at a second service platform using the first service platform. In response to receiving the first request, the first service platform may transmit, at a first time instance, a second request to access the extensible resources at the second service platform. In response, the second service platform may transmit a response to the first service platform at a second time instance subsequent to the first time instance. The second time instance, in which the first service platform may receive the response, may be based on an extensibility latency associated with the extensible resources. The first service platform may determine a server latency associated with the first service platform that may be unassociated with the extensibility latency.

20 Claims, 8 Drawing Sheets ially, or alternatively, the necessity of separately logging in to each application may impose a considerable burden on the user, who must enter usernames and passwords for each application used. The user may use a service platform to help manage contacts or other identifying information associated with accounts for accessing software applications through login requests. Additionally, or alternatively, the user may use the service platform to access user-controlled resources associated with a login request. In some cases, the user-controlled resources may increase a latency associated with the login request.

TECHNIQUES FOR DISCOUNTING EXTENSIBILITY LATENCY

FIELD OF TECHNOLOGY

The present disclosure relates generally to extensible service platforms, and more specifically, to techniques for discounting extensibility latency.

BACKGROUND

A software application may request a user to log into an account using authentication information, such as a combination of a username and a password. Users who have accounts for several different applications must therefore remember several different usernames and passwords. Additionally, or alternatively, the necessity of separately logging in to each application may impose a considerable burden on the user, who must enter usernames and passwords for each application used. The user may use a service platform to help manage contacts or other identifying information associated with accounts for accessing software applications through login requests. Additionally, or alternatively, the user may use the service platform to access user-controlled resources associated with a login request. In some cases, the user-controlled resources may increase a latency associated with the login request.

SUMMARY

The described techniques relate to improved methods, systems, devices, and apparatuses that support techniques for discounting extensibility latency. For example, the described techniques provide a framework for differentiating a latency associated with extensible resources from a latency associated with a service platform through which the extensible resources are accessed. In some examples, the service platform may determine the latency associated with the extensible resources based on a time duration between a time instance in which the service platform may transmit a request to another service platform associated with the extensible resources and a time instance in which the service platform may receive a response to the request. The service platform may exclude the determined time duration from the latency associated with the service platform. For example, the latency associated with the extensible resources may be unassociated with the determination of the of the latency associated with the service platform. In some examples, such techniques may enable the service platform to increase an accuracy with which performance metrics associated with the service platform are determined.

A method for measuring latency is described. The method may include receiving, at a first service platform, a first request to access one or more resources via the first service platform, where the first request is received at a first time instance and the one or more resources are associated with at least a second service platform, transmitting, to the second service platform, a second request to access the one or more resources, where the second request is transmitted at a second time instance and in response to receiving the first request, where a difference between the second time instance and the first time instance includes a first time duration, receiving, from the second service platform and after a second time duration, a first response corresponding to the second request, where the first response is received at a third time instance based on a first latency associated with the second service platform, transmitting, at a fourth time instance and based on the first response, a second response corresponding to the first request to access the one or more resources, where a difference between the fourth time instance and the third time instance includes a third time duration, and determining a second latency associated with accessing the one or more resources via the first service platform based on the first time duration and the third time duration, where the second time duration is unassociated with the determination of the second latency.

An apparatus for measuring latency is described. The apparatus may include a processor, memory coupled with the processor, and instructions stored in the memory. The instructions may be executable by the processor to cause the apparatus to receive, at a first service platform, a first request to access one or more resources via the first service platform, where the first request is received at a first time instance and the one or more resources are associated with at least a second service platform, transmit, to the second service platform, a second request to access the one or more resources, where the second request is transmitted at a second time instance and in response to receiving the first request, where a difference between the second time instance and the first time instance includes a first time duration, receive, from the second service platform and after a second time duration, a first response corresponding to the second request, where the first response is received at a third time instance based on a first latency associated with the second service platform, transmit, at a fourth time instance and based on the first response, a second response corresponding to the first request to access the one or more resources, where a difference between the fourth time instance and the third time instance includes a third time duration, and determine a second latency associated with accessing the one or more resources via the first service platform based on the first time duration and the third time duration, where the second time duration is unassociated with the determination of the second latency.

Another apparatus for measuring latency is described. The apparatus may include means for receiving, at a first service platform, a first request to access one or more resources via the first service platform, where the first request is received at a first time instance and the one or more resources are associated with at least a second service platform, means for transmitting, to the second service platform, a second request to access the one or more resources, where the second request is transmitted at a second time instance and in response to receiving the first request, where a difference between the second time instance and the first time instance includes a first time duration, means for receiving, from the second service platform and after a second time duration, a first response corresponding to the second request, where the first response is received at a third time instance based on a first latency associated with the second service platform, means for transmitting, at a fourth time instance and based on the first response, a second response corresponding to the first request to access the one or more resources, where a difference between the fourth time instance and the third time instance includes a third time duration, and means for determining a second latency associated with accessing the one or more resources via the first service platform based on the first time duration and the third time duration, where the second time duration is unassociated with the determination of the second latency.

A non-transitory computer-readable medium storing code for measuring latency is described. The code may include instructions executable by a processor to receive, at a first service platform, a first request to access one or more resources via the first service platform, where the first request is received at a first time instance and the one or more resources are associated with at least a second service platform, transmit, to the second service platform, a second request to access the one or more resources, where the second request is transmitted at a second time instance and in response to receiving the first request, where a difference between the second time instance and the first time instance includes a first time duration, receive, from the second service platform and after a second time duration, a first response corresponding to the second request, where the first response is received at a third time instance based on a first latency associated with the second service platform, transmit, at a fourth time instance and based on the first response, a second response corresponding to the first request to access the one or more resources, where a difference between the fourth time instance and the third time instance includes a third time duration, and determine a second latency associated with accessing the one or more resources via the first service platform based on the first time duration and the third time duration, where the second time duration is unassociated with the determination of the second latency.

In some examples of the method, apparatuses, and non-transitory computer-readable medium described herein, receiving the first request may include operations, features, means, or instructions for receiving, at the first service platform, a login request to access extensible code via the first service platform, where the extensible code may be stored in an extension of the first service platform, the second service platform including the extension of the first service platform.

In some examples of the method, apparatuses, and non-transitory computer-readable medium described herein, transmitting the second request may include operations, features, means, or instructions for executing the extensible code in the extension of the first service platform, where the first response may be received at the third time instance based on an extensibility latency associated with the extensible code.

In some examples of the method, apparatuses, and non-transitory computer-readable medium described herein, the login request includes a network protocol request.

Some examples of the method, apparatuses, and non-transitory computer-readable medium described herein may further include operations, features, means, or instructions for generating a directed acyclic graph (DAG) to individually identify the first time duration, the second time duration, and the third time duration, where determining the second latency may be based on the identifying.

Some examples of the method, apparatuses, and non-transitory computer-readable medium described herein may further include operations, features, means, or instructions for implementing the DAG using distributed tracing, where individually identifying the first time duration, the second time duration, and the third time duration may be based on the distributed tracing.

In some examples of the method, apparatuses, and non-transitory computer-readable medium described herein, the first time duration, the second time duration, and the third time duration each include a node of the DAG.

In some examples of the method, apparatuses, and non-transitory computer-readable medium described herein, determining the second latency may include operations, features, means, or instructions for determining a fourth time duration including a difference between the first time instance and the fourth time instance, where the second latency may be based on a difference between the fourth time duration and the second time duration.

In some examples of the method, apparatuses, and non-transitory computer-readable medium described herein, determining the second latency may include operations, features, means, or instructions for obtaining telemetry information associated with accessing the one or more resources via the first service platform, determining the first time duration and the third time duration based on the obtained telemetry information, and determining the second latency based on determining the first time duration and the third time duration.

In some examples of the method, apparatuses, and non-transitory computer-readable medium described herein, the telemetry information includes a respective timestamp corresponding to each of the first time instance, the second time instance, the third time instance, and the fourth time instance.

In some examples of the method, apparatuses, and non-transitory computer-readable medium described herein, the telemetry information includes a respective trace corresponding to each of the first time duration, the second time duration, and the third time duration.

In some examples of the method, apparatuses, and non-transitory computer-readable medium described herein, receiving the first request may include operations, features, means, or instructions for receiving, at the first service platform, a request to access a set of multiple resources via the first service platform, where the request may be received at the first time instance and the set of multiple resources may be associated with a set of multiple service platforms.

In some examples of the method, apparatuses, and non-transitory computer-readable medium described herein, the set of multiple service platforms includes at least one service platform that may be an extension of the first service platform and at least one other service platform that may be an extension of the at least one service platform.

DETAILED DESCRIPTION

Figure 1:
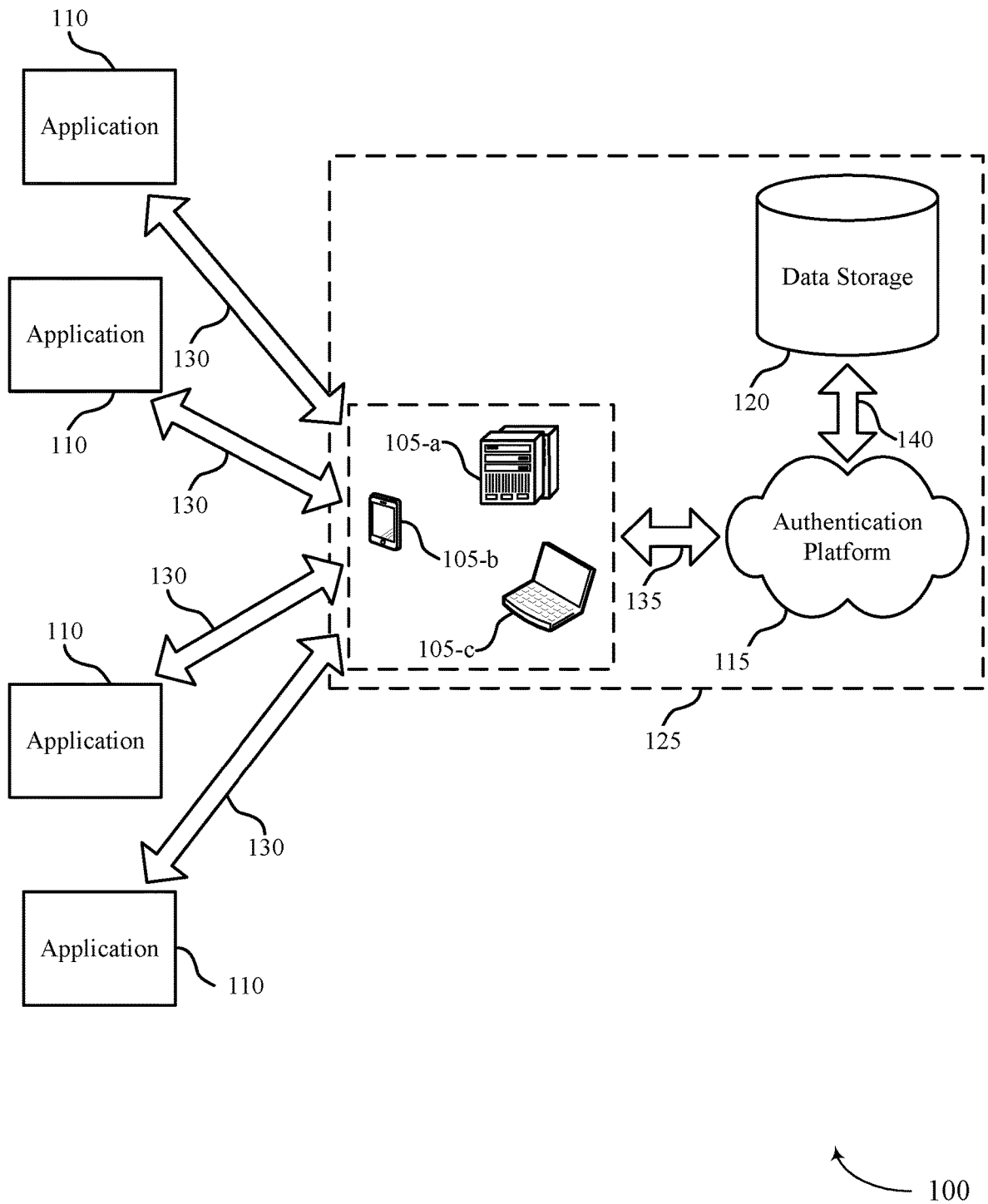
FIG. 1 illustrates an example of a system that supports techniques for discounting extensibility latency in accordance with aspects of the present disclosure.

A user may use a service platform to manage identifying information associated with the user. The identifying information may include personal information (e.g., name, social security number, driver license number), contact information (e.g., home address, telephone number, email address), payment information (e.g., credit card number, bank information), account information (e.g., usernames, passwords), or any combination thereof. Additionally, or alternatively, the user may use the service platform to access resources associated with a request (e.g., a login request, a network protocol request). For example, the user may use the service platform to authenticate and authorize access to resources as part of a login request. The service platform may be stored locally at a device of the user (e.g., a client device). Additionally, or alternatively, the service platform may be implemented as a cloud platform, and the user may access the service platform via a cloud client. In some examples, the resources accessed via the login request may be extensible and controlled by the user (e.g., user-controlled resources). For example, the service platform may provide extensibility in which the user may use the service platform to access extensible resources via the login request. In some examples, the extensible resources may include extensible code to be executed in an extension of the service platform via the login request. However, the extensible code may be erroneous (e.g., incorrect, broken, insufficient) and fail to execute suitably. As such, executing the extensible code (e.g., accessing the extensible resources) via the login request may lead to increased latency for the user. Additionally, or alternatively, the service platform may be incapable of determining whether increased latency experienced by the user is due to the service platform or the extensible code. It may be beneficial to configure the service platform to differentiate latency associated with the extensible resources from latency associated with the service platform.

Various aspects of the present disclosure relate to techniques for discounting extensibility latency, and more specifically, to techniques for differentiating a latency associated with extensible resources from a latency associated with a service platform through which the extensible resources are accessed. For example, at a first time instance, a service platform may receive a request (e.g., a login request from a user) to access one or more resources via the service platform. The one or more resources may be associated with an extension of the internal service platform (e.g., another service platform, a service platform external to the service platform, an external service platform). That is, the one or more resources may include extensible resources (e.g., extensible code) associated with an extension of the service platform (e.g., the external service platform). In response to receiving the login request, the service platform may forward the request to the extension a second time instance. In response to forwarding the request, the service platform may receive a response from the extension at a third time instance and forward the response to the user (e.g., via a client device) at a fourth time instance.

In some examples, the third time instance, in which the response is received at the service platform from the extension, may depend on a first latency associated with the extensible resources (e.g., an increased latency due to extensible code being erroneous). That is, a time duration between the second time instance and the third time instance may correspond to a latency associated with the extensible resources (e.g., an extensibility latency), while a time duration between the first time instance and the second time instance and a time duration between the third time instance and the fourth time instance may correspond to a latency associated with accessing the extensible resources using the service platform (e.g., a server latency). As such, the service platform may exclude the time duration corresponding to the extensibility latency (e.g., the time duration between the second time instance and the third time instance) from the determination of the server latency. That is, the extensibility latency may be unassociated with the determination of the server latency. In some examples, by excluding (e.g., discounting) the extensibility latency from the server latency, the service platform may increase an accuracy with which performance metrics (e.g., latency metrics) associated with the service platform are determined.

In some examples, the service platform may use a directed acyclic graph (DAG) to identify the time duration associated with the extensibility latency and the other time durations associated with the server latency. For example, the service platform may implement the DAG using distributed tracing. In such an example, the service platform may identify (e.g., individually) each time duration (e.g., the time duration associated with the extensibility latency and the other time durations associated with the server latency) using the distributed tracing. In some examples, traces (e.g., distributed traces) corresponding to each time duration may be obtained by the service platform through telemetry. That is, the service platform may obtain telemetry information associated accessing the extensible resources using the service platform and the telemetry information may include traces (or timestamps) for each of the time durations.

In some examples, the extensible resources may be associated with multiple extensions of the service platform. For example, the service platform may receive a login request to access multiple resources associated with multiple (e.g., different) extensions of the service platform, such as multiple (e.g., different) external service platforms (e.g., software applications, websites, environments for executing extensible code, or any combination thereof). In some examples, the external service platforms may be associated with the service platform or other external service platforms. For example, the service platform may receive the login request and forward the request to one or multiple external service platforms that may each delegate the request (or other associated requests) to one or more other external service platforms. In such an example, time durations during which the request (e.g., and other associated requests) may be processed externally to the service platform (e.g., time duration associated with the external service platforms) may be based on the extensibility latency. As such, the service platform may exclude (e.g., discount) such time durations from the determined server latency.

Aspects of the subject matter described herein may be implemented to realize one or more of the following potential advantages. For example, the techniques employed by the service platform may provide benefits and enhancements to determining performance metrics, including enabling the service platform to differentiate extensibility latency from a server latency associated with the service platform. Aspects of the disclosure are initially described in the context of a system for distributed computing. Aspects of the disclosure are further illustrated by and described with reference to process flows, a latency diagram, apparatus diagrams, system diagrams, and flowcharts that relate to techniques for discounting extensibility latency.

FIG. 1 illustrates an example of a system 100 for distributed computing (e.g., cloud computing) that supports techniques for discounting extensibility latency in accordance with various aspects of the present disclosure. The system 100 includes client devices 105, applications 110, authentication platform 115, and data storage 120. Authentication platform 115 may be an example of a public or private cloud network. A client device 105 may access authentication platform 115 over network connection 135. The network may implement transmission control protocol and internet protocol (TCP/IP), such as the Internet, or may implement other network protocols. A client device 105 may be an example of a user device, such as a server (e.g., client device 105-*a*), a smartphone (e.g., client device 105-*b*), or a laptop (e.g., client device 105-*c*). In other examples, a client device 105 may be a desktop computer, a tablet, or another computing device or system capable of generating, analyzing, transmitting, or receiving communications. In some examples, a client device 105 may be operated by a user that is part of a business, an enterprise, a non-profit, a startup, or any other organization type.

A client device 105 may interact with multiple applications 110 via one or more interactions 130. The interactions 130 may include digital communications, application programming interface (API) calls, hypertext transfer protocol (HTTP) messages, or any other interaction between a client device 105 and an application 110. Data may be associated with the interactions 130. A client device 105 may access authentication platform 115 to store, manage, and process the data associated with the interactions 130. In some cases, the client device 105 may have an associated security or permission level. A client device 105 may have access to some applications, data, and database information within authentication platform 115 based on the associated security or permission level, and may not have access to others.

Applications 110 may interact with the client device 105 via email, web, text messages, or any other appropriate form of interaction. The interaction 130 may be a business-to-business (B2B) interaction or a business-to-consumer (B2C) interaction. An application 110 may also be referred to as a customer, a client, a website, or some other suitable terminology. In some cases, the application 110 may be an example of a server, a node, a compute cluster, or any other type of computing system, component, or environment. In some cases, the application 110 may be operated by a user or group of users.

Authentication platform 115 may offer cloud-based services to the client devices 105, the applications 110, or both. In some cases, authentication platform 115 may support database system such as a multi-tenant database system. In such cases, authentication platform 115 may serve multiple client devices 105 with a single instance of software. However, other types of systems may be implemented, including—but not limited to—client-server systems, mobile device systems, and mobile network systems. Authentication platform 115 may receive data associated with interactions 130 from the client device 105 over network connection 135, and may store and analyze the data. In some cases, authentication platform 115 may receive data directly from an interaction 130 between an application 110 and the client device 105. In some cases, the client device 105 may develop applications to run on authentication platform 115. Authentication platform 115 may be implemented using remote servers. In some cases, the remote servers may be examples of data storage 120.

Data storage 120 may include multiple servers. The multiple servers may be used for data storage, management, and processing. Data storage 120 may receive data from authentication platform 115 via connection 140, or directly from the client device 105 or an interaction 130 between an application 110 and the client device 105. Data storage 120 may utilize multiple redundancies for security purposes. In some cases, the data stored at data storage 120 may be backed up by copies of the data at multiple locations.

Subsystem 125 may include client devices 105, authentication platform 115, and data storage 120. In some cases, data processing may occur at any of the components of subsystem 125, or at a combination of these components. In some cases, servers may perform the data processing. The servers may be a client device 105 or located at data storage 120.

As described herein, a subsystem 125 (e.g., a service platform associated with a client device 105 or an authentication platform 115) may be configured to access an application 110 (e.g., one or more resources associated with an application 110) via an interaction 130. The applications 110 may be examples of other service platforms (e.g., extensions of the subsystem 125, external service platforms). For example, the subsystem 125 may be configured to authenticate and authorize access to resources associated with one or more of the applications 110 as part of a request (e.g., a login request, a network protocol request) from a user via a client device 105. The resources may include extensible resources, such as extensible code. For example, as part of the login request, the user may wish to execute extensible code controlled (e.g., written, developed) by the user using the subsystem 125. That is, the user may use the subsystem 125 to execute custom actions that may be codified as snippets of user-controlled code (e.g., a script). In such an example, if the extensible (e.g., user-controlled) code is erroneous (e.g., incorrect, broken, insufficient) and fails to execute suitably, a latency (e.g., a client latency) associated with accessing the extensible resources using the subsystem 125 may be increased. That is, a client latency associated with processing requests from the user using the internal service platform 225 (e.g., and which may be reported or included in a service level agreement (SLA)) may be inaccurate due to the client latency including the latency associated with the extensible resources.

As described herein, latency associated with extensible resources, such as the extensible code, may be referred to as extensibility latency. It may be beneficial to configure the subsystem 125 (e.g., a service platform) to differentiate extensibility latency from latency associated with the subsystem 125 (e.g., a server latency). For example, it may be beneficial to exclude (e.g., discount) the extensibility latency from a determined client latency. In some examples, the subsystem 125 may differentiate the extensibility latency from the server latency based on batch reporting. For example, after a login request is completed, the subsystem 125 may obtain a latency determined at the application 110 (e.g., based on transactions that occur at the application 110) and discount the obtained (e.g., reported) latency from a client latency determined at the subsystem 125. In some examples, however, such techniques (e.g., techniques which rely on external services to log and report the extensibility latency) may be rigid and lead to increased processing at the subsystem 125.

In other examples, the subsystem 125 may dynamically identify time durations in which processing associated with the request may be performed at the subsystem 125 and other durations of time in which processing associated with the request may be performed at one or more of the applications 110. For example, the subsystem 125 may receive a request from a user (e.g., via a client device 105) to access one or more resources associated with an application 110. In some examples, the subsystem 125 may model the request as a DAG and implement the DAG using distributed tracing. For example, the subsystem 125 may generate the DAG in response to receiving the request and use the DAG (e.g., propagate the DAG with the request) to determine one or more time durations in which processing associated with the request is performed at the subsystem 125 (e.g., a target system) and one or more other time durations in which processing associated with the request is performed at one or more of the application 110 (e.g., other time durations due to the extensibility latency).

For example, using the DAG, the subsystem 125 may determine a first time instance in which the subsystem may receive the request from the user and a second time instance in which the subsystem 125 may forward the request to an application 110. That is, the subsystem 125 may use the DAG to determine a first time duration in which processing associated with the request may be performed at the subsystem 125. Additionally, or alternatively, the subsystem 125 may determine (e.g., using the DAG) a third time instance in which the subsystem 125 may receive a response to the request from the application 110 and a fourth time instance in which the subsystem 125 may forward the response to the user. That is, the subsystem 125 may determine a second time duration in which processing associated with the request is performed at the application 110 and a third time duration in which processing associated with the request may be performed at the subsystem 125. As such, the subsystem 125 may be capable of dynamically differentiating the extensibility latency (e.g., the second time duration in which processing associated with the request may be performed at the application 110) from the server latency (e.g., the first time duration and the second time duration in which processing associated with the request may be performed at the subsystem 125).

In some examples, the subsystem 125 may receive, from a user via a client device 105, a login request to execute extensible code that may be stored in an application 110 (e.g., an extension of the subsystem 125) using the subsystem 125. In response to receiving the login request (e.g., a network protocol request), the subsystem 125 may transmit, at a first time instance, a request to execute the extensible code at the application 110. In response to executing the extensible code, the application 110 may transmit an execution response to the subsystem 125 at a second time instance subsequent to the first time instance. The second time instance, in which the subsystem 125 may receive the execution response from the application 110, may be based on an extensibility latency associated with the extensible code. As such, the subsystem 125 may use the DAG to identify a time duration between the first time instance and the second time instance, such that the subsystem 125 may exclude (e.g., discount) the time duration from a client latency (e.g., an overall latency) associated with accessing the extensible code using the subsystem 125.

It should be appreciated by a person skilled in the art that one or more aspects of the disclosure may be implemented in a system 100 to, additionally, or alternatively, solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
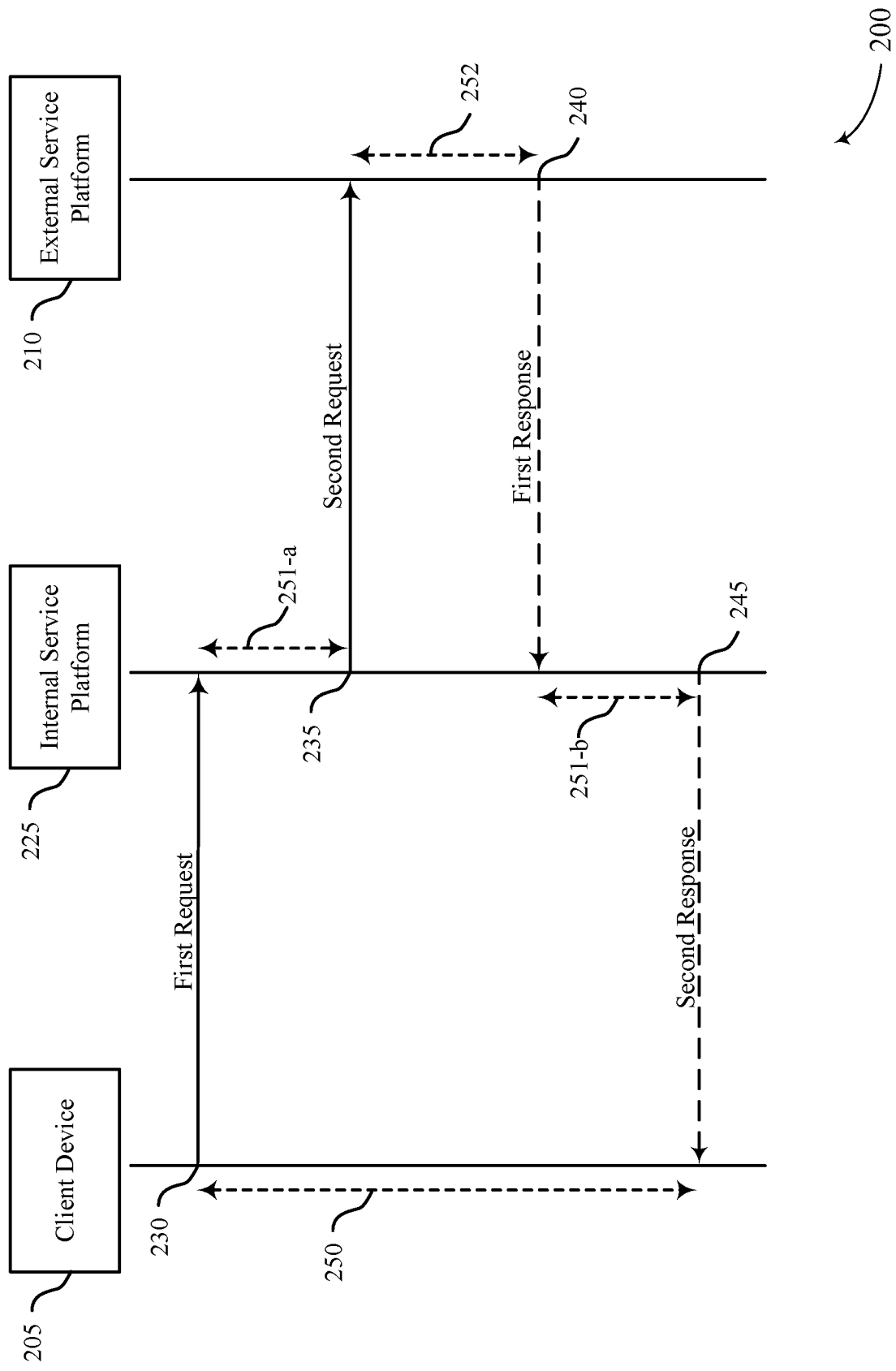
FIGS. 2 and 3 each illustrate an example of a process flow that supports techniques for discounting extensibility latency in accordance with aspects of the present disclosure.

FIG. 2 illustrates an example of a process flow 200 that supports techniques for discounting extensibility latency in accordance with aspects of the present disclosure. In some examples, the process flow 200 may implement aspects of the system 100. For example, the process flow 200 may illustrate operations between an internal service platform 225, an external service platform 210, and a client device 205, which may be examples of a subsystem 125, an application 110, and a client device 105, respectively, as described with reference to FIG. 1. The process flow 200 may be implemented at the internal service platform 225, the external service platform 210, the client device 205 or any combination thereof. In the following description of the process flow 200, the information communicated between the internal service platform 225, the external service platform 210, and the client device 205 may be performed in different orders or at different times. Some operations may be omitted from the process flow 200 and other operations may be added to the process flow 200.

In some examples, the internal service platform 225 may support extensibility that may enable users (e.g., customers, such as via the client device 205) to access extensible resources (e.g., execute extensible code) as part of a request (e.g., login request) using the internal service platform 225. For example, the internal service platform 225 may support login extensibility that may enable users to execute user-controlled code (e.g., the extensible code) as part of a login process using the internal service platform 225. That is, the extensibility of the internal service platform 225 may enable a user to write code (e.g., via the client device 205 using JavaScript or one or more other programming languages) and have the code executed as part of the login process (e.g., a network protocol request). In some examples, the internal service platform 225 may execute the extensible code in an extension of the internal service platform 225 (e.g., at the external service platform 210). For example, the external service platform 210 may be an example of an environment (e.g., a sandbox) in which the extensible code may be executed during the login process.

In some examples, latency and availability of resources associated with the internal service platform 225 may be monitored to determine a system performance of the internal service platform 225 (e.g., a health of login processes flows using the internal service platform 225). However, the latency and availability of resources may be unreliable indicators of the system performance if the system (e.g., the internal service platform 225) executes extensible code (e.g., user-controlled code). For example, a user may introduce code that may be incorrect or may time out. That is, if extensible code to be executed using the internal service platform 225 is erroneous (e.g., incorrect, buggy) the extensible code may increase a time duration of the login process (e.g., an overall login time). Additionally, or alternatively, differentiating errors (or a latency due to errors) in the extensible code from errors (or a latency due to errors) in the internal service platform 225 may be complex (e.g., may be relatively difficult to achieve). That is, performance metrics (e.g., performance data) associated with accessing extensible resources, such as extensible code controlled by a user, using the internal service platform 225 may be unreliable (e.g., and relatively inaccurate). As such, determining a server latency associated with the internal service platform 225 (e.g., a server latency that may correspond to a latency SLA of an enterprise contract) may also be unreliable (e.g., and relatively inaccurate) and lead to increased processing at the internal service platform 225.

In some examples, the internal service platform 225 may measure a system latency (e.g., a client latency) associated with a request (e.g., a login request, a network protocol request) from the client device 205 through a loadbalancer. For example, a user may request for extensible code (e.g., custom JavaScript or other script written using another programming language) to be executed at the external service platform 210 as part of a login request. The extensible code may include errors (e.g., bugs introduced from the user) that may lead to increased processing at the external service platform 210 unnecessarily (e.g., may lead to unnecessary work). In such an example, the client latency measured at the loadbalancer may be relatively inaccurate. For example, the loadbalancer may measure a client latency of about 10 seconds and a latency associated with the extensible code (e.g., a extensibility latency) may be about 9 seconds. In such an example, the measured client latency of about 10 seconds may be reported (e.g., to the user), while the server latency associated with the internal service platform 225 may be about 1 second. That is, while the loadbalancer measured a client latency of about 10 seconds, the login request may have executed within a bounded quantity of time (e.g., about 1 s). In some examples, a client latency measured at the loadbalancer (e.g., that may include extensibility latency) may lead to inaccuracies in the reported client latency. As such, differentiating between durations of time in which the request is processed at the internal service platform 225 and the external service platform 210 may be beneficial.

In some examples, the internal service platform 225 may determine a client latency through combining (e.g., stitching) performance metrics emitted from each system associated with the login request (e.g., the internal service platform 225 and the external service platform 210). For example, the internal service platform 225 and the external service platform 210 may each determine (e.g., log) a latency associated with transactions (e.g., processing) performed at the respective service platform as part of a login request. In such an example, the internal service platform 225 may perform processing subsequent to the login request being completed (e.g., may perform post processing on latencies that may be batch reported to the internal service platform 225) to determine the client latency. For example, code (e.g., a script) may be used to query and stitch together portions (e.g., all legs) of the login request, which may be costly and increase processing time at the internal service platform 225.

In some examples, techniques for discounting extensibility latency, as described herein, may provide one or more enhancements to determining server latencies associated with accessing extensible resources using the internal service platform 225. For example, the internal service platform 225 may support techniques for determining (e.g., calculating with increased accuracy) a latency and availability of resources for requests (e.g., web requests, login requests) that may execute extensible code (e.g., user-controlled code that may be untrusted). Such techniques may, in some examples, be implemented at the internal service platform 225 (e.g., in an internal library of the internal service platform 225) using one or more algorithms.

As illustrated in the example of FIG. 2, the internal service platform 225 may model a login request as a DAG that may be implemented using distributed tracing (e.g., one or more distributed tracing technologies). For example, once a DAG is created (e.g., generated at the internal service platform 225) a time duration used for processing the login request at the internal service platform 225 and other time durations used for executing the extensible code at the external service platform 210 may be recorded. That is, the DAG may be propagated to each system (e.g., the internal service platform 225 and the external service platform 210), such that a time duration used for processing at each system (e.g., as part of the login request) may be recorded and returned to the internal service platform 225 (e.g., the calling system). In some examples, by propagating the DAG with the login request context a client latency 250 (e.g., an overall latency, a system latency) may be obtained (e.g., emitted, output) at the internal service platform 225 (e.g., from a single point), for example rather than combining multiple metrics from multiple (e.g., different) systems using post processing.

For example, at 230, the internal service platform 225 may receive a first request from the client device 205 to access one or more resources associated with the external service platform 210 via the internal service platform 225. The first request (e.g., an HTTP request or another type of network protocol request) may be received at the internal service platform 225 at a first time instance. For example, the client device 205 may transmit the first request (e.g., a login request that includes extensible code) to the internal service platform 225 at the first time instance.

At 235, the internal service platform 225 may transmit a second request to access the one or more resources to the external service platform 210. The second request may be transmitted at a second time instance in response to receiving the first request. That is, in response to receiving a login request (e.g., the first request received at 230), the internal service platform 225 may perform some processing (e.g., relatively light processing) and transmit the login request (or one or more associated login requests) to the external service platform 210. The extensible code may be executed at the external service platform 210 in response to the second request being transmitted at 235. In some examples, a first time duration corresponding to a difference between the second time instance and the first time instance (e.g., a time duration during which the internal service platform may perform the processing) may be based on a server latency 251-$a$ (e.g., a request latency) associated with accessing the one or more resources using the internal service platform 225.

In some examples, at 240, and after a second time duration, the internal service platform 225 may receive a first response corresponding to the second request (e.g., the login request) from the external service platform 210. That is, in response to the extensible code being executed at the external service platform 210, an execution response (e.g., the first response) may be returned to the internal service platform 225. In such an example, the first response may be received at a third time instance based on an extensibility latency 252 associated with the extensible code.

In some examples, at 245, and based on receiving the first response at 240, the internal service platform 225 may transmit a second response corresponding to the first request to access the one or more resources (e.g., the login request) at a fourth time instance. That is, in response to receiving the execution response (e.g., the first response received at 240), the internal service platform 225 may perform some processing (e.g., additional processing) and transmit a login response (e.g., may return the login request) to the client device 205. In such an example, a time duration corresponding to a difference between the fourth time instance and the third time instance may be based on a server latency 251-$b$ (e.g., another request latency) associated with accessing the one or more resources using the internal service platform 225.

In some examples, the internal service platform 225 may determine a second latency associated with accessing the one or more resources via the internal service platform 225 based on the first time duration (e.g., associated with the server latency 251-$a$) and the third time duration (e.g., associated with the server latency 251-$b$). In such examples, the second time duration (e.g., associated with the extensibility latency 252) may be unassociated with the determination of the second latency.

In some examples, the process flow 200 may illustrate multiple types of latencies, including request latencies (e.g., the server latency 251-*a* and the server latency 251-*b*) that may indicate how long the request may be processed at the internal service platform 225 (e.g., and may account for latencies that may be included in an enterprise contract). Additionally, or alternatively, the process flow 200 may illustrate an extensibility latency 252 that may indicate a time duration in which the external service platform 210 may process the extensible code (e.g., and may not be considered as part of the latencies included in the enterprise contract). That is, the internal service platform 225 may differentiate the server latencies 251 from the extensibility latency 252, such that the extensibility latency 252 may be excluded from latencies reported for the internal service platform 225 (e.g., from latencies recorded at the internal service platform 225 to calculate contractual latency commitments). For example, the extensibility latency 252 may be excluded (e.g., discounted) from the client latency 250. That is, a time duration corresponding to the server latencies 251 may include a difference between a time duration of the client latency 250 and the second time duration based on the extensibility latency 252. In some examples, by differentiating the server latencies 251 from the extensibility latency 252, the internal service platform 225 may increase an accuracy at which performance metrics of the internal service platform 225 may be determined, among other possible benefits.

Figure 3:
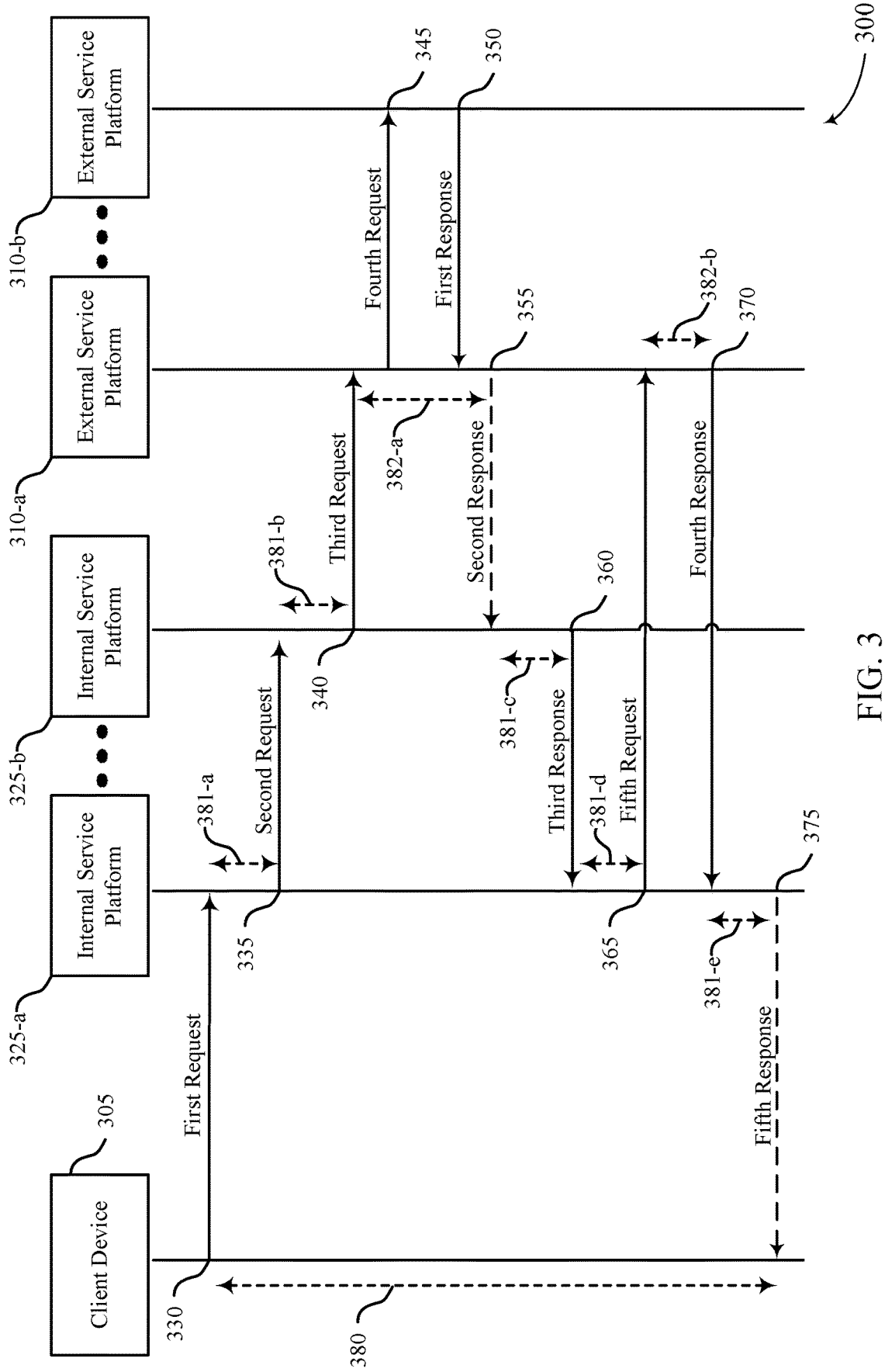

FIG. 3 illustrates an example of a process flow 300 that supports techniques for discounting extensibility latency in accordance with aspects of the present disclosure. In some examples, the process flow 300 may implement aspects of the system 100 and the process flow 200. For example, the process flow 300 may illustrate operations between one or more internal service platforms 325 (e.g., an internal service platform 325-*a* and an internal service platform 325-*b*), one or more external service platforms 310 (e.g., an external service platform 310-*a* and an external service platform 310-*b*), and a client device 305 which may be examples of the corresponding devices as described with reference to FIG. 2. The process flow 300 may be implemented at one or both of the internal service platforms 325, one or both of the external service platforms 310, or the client device 305, or any combination thereof. In the following description of the process flow 300, the information communicated between the internal service platforms 325, the external service platforms 310, and the client device 305 may be performed in different orders or at different times. Some operations may be omitted from the process flow 300 and other operations may be added to the process flow 300.

In some examples, an internal service platform (e.g., one or more of the internal service platforms 325) may identify time durations associated with extensibility latencies 382 and other time durations associated with server latencies 381. For example, the internal service platform 325 may implement a DAG to identify the time durations (e.g., legs, segments, parts) of a client latency 380 that may be associated with the extensibility latency 382 and the other time durations (e.g., other legs, segments, parts) of the client latency 380 that may be associated with the server latency 381 using distributed tracing (e.g., open tracing). In some examples, open tracing may be extended to multiple technologies for tracing, such as open telemetry. As such, the internal service platform 225 may trace requests that include extensible code written in multiple different languages (e.g., for any service built in any language). Additionally, or alternatively, in some examples, the extensible resources may be associated with multiple extensions of the internal service platform 325.

At 330, the internal service platform 325-*a* may receive a first request to access multiple resources associated with multiple (e.g., different) extensions of the service platform, such as other internal service platforms (e.g., the internal service platform 325-*a*), or multiple external service platforms 310, or any combination thereof. For example, in response to receiving the first request at 330, the internal service platform 325-*a* may perform some processing and, at 335, transmit a second request to the internal service platform 325-*b* (e.g., and one or more other internal service platforms). That is, the internal service platform 325-*a* may transmit (e.g., delegate) the second request to multiple other internal service platforms, including the internal service platform 325-*b*. In such an example, a time instance in which the second request is transmitted (e.g., at 335) may be based on a server latency 381-*a* associated with accessing resources using the internal service platform 325-*a*. The server latency 381-*a* may represent a node (e.g., a first node) of the DAG.

At 340, the internal service platform 325-*b* may perform some processing and transmit a third request to the external service platform 310-*a* (e.g., and one or more other external service platforms). That is, the internal service platform 325-*b* may transmit (e.g., delegate) the third request to multiple external service platforms, including the external service platform 310-*a*. In such an example, a time instance in which the third request is transmitted (e.g., at 335) may be based on a server latency 381-*b* associated with accessing resources using the internal service platform 325-*b*. The server latency 381-*b* may represent another node of the DAG.

At 345, the external service platform 310-*a* may perform some processing and transmit a fourth request to the external service platform 310-*b* (e.g., and one or more other external service platforms). That is, the external service platform 310-*a* may transmit (e.g., delegate) the fourth request to multiple external service platforms, including the external service platform 310-*b*.

At 350, the external service platform 310-*a* may receive a first response from the external service platform 310-*b* corresponding to the fourth request. In some examples, at 355, in response to receiving the first response, the external service platform 310-*a* may transmit a second response to the internal service platform 325-*b* corresponding to the third request transmitted at 340. In such an example, a time instance in which the fourth request is transmitted (e.g., at 355) may be based on an extensibility latency 382-*a* associated with one or more of the multiple resources (e.g., one or more resources that may be stored at the external service platform 310-*a*, the external service platform 310-*b*, one or more other external service platforms, or any combination thereof). That is, the extensibility latency 382-*a*, which may represent another node of the DAG, may correspond to each time duration in which an external service platform may perform processing associated with the multiple resources (e.g., in response to the third request transmitted at 340). For example, if a single request from an internal service platform to an external service platform leads to multiple other request being transmitted between multiple other external service platforms, the internal service platform may track (e.g., using the DAG) time durations in which processing may be performed as part of the multiple other requests as a single node of the DAG.

At 360, the internal service platform 325-*b* may perform some processing and transmit a third response to the internal service platform 325-*a* corresponding to the second request transmitted at 335. In such an example, a time instance in which the third response is transmitted at 360 may be based on a server latency 381-*c* associated with accessing resources using the internal service platform 325-*b*. The server latency 381-*c* may represent another node of the DAG.

At 365, the internal service platform 325-*a* may perform some processing and transmit a fifth request to the external service platform 310-*a* (or one or more other external service platforms). In some examples, a time instance in which the fifth request is transmitted (e.g., at 365) may be based on a server latency 381-*d* associated with accessing resources using the internal service platform 325-*a*. The server latency 381-*d* may represent another node of the DAG.

At 370, the external service platform 310-*a* may perform some processing and transmit a fourth response to the internal service platform 325-*a* corresponding to the fifth request transmitted at 365. In some examples, a time instance in which the fourth response is transmitted (e.g., at 370) may be based on an extensibility latency 382-*b* associated with one or more of the multiple resources. The extensibility latency 382-*b* may represent another node of the DAG.

In some examples, at 375, the internal service platform 325-*a* may perform some processing and transmit a fifth response to the client device 305 corresponding to the first request transmitted at 330. In such an example, a time instance in which the fifth response is transmitted (e.g., at 375) may be based on a server latency 381-*e* associated with accessing resources using the internal service platform 325-*a*. The server latency 381-*e* may represent another node (e.g., a last node) of the DAG. For example, as part of the first request transmitted at 330, multiple other request (e.g., to access one or more of the multiple resources) may be transmitted between internal service platforms 325 (e.g., the second request transmitted at 335), between internal service platforms 325 and external service platforms 310 (e.g., the third request transmitted at 340 and the fifth request transmitted at 365), and between external service platforms 310 (e.g., the fourth request transmitted at 345). In such an example, the internal service platform 325-*a* (e.g., and one or more other internal service platforms) may use the DAG to identify each time duration in which processing may be performed as part of the first request at an internal service platform 325 (e.g., the time durations corresponding to the server latency 381-*a*, the server latency 381-*b*, the server latency 381-*c*, the server latency 381-*d*, and the server latency 381-*e*) as well as time durations in which processing may be performed as part of the request at an external service platform 310 (e.g., the time duration corresponding to the extensibility latency 382-*b* and the time duration corresponding to the extensibility latency 382-*a*).

In some examples, by using the DAG to differentiate the server latencies 381 from the extensibility latencies 382, one or more internal service platforms 325 may determine a latency (e.g., an overall server latency) associated with the internal service platforms 325 that may be unassociated with the extensibility latencies 382. In such examples, the internal service platforms 325 may improve an accuracy at which performance metrics may be determined for the internal service platforms 325, among other possible benefits.

Figure 4:
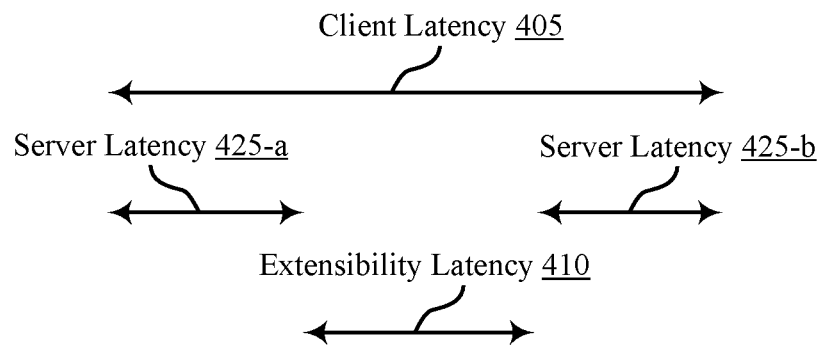
FIG. 4 illustrates an example of a latency diagram that supports techniques for discounting extensibility latency in accordance with aspects of the present disclosure.

FIG. 4 illustrates an example of a latency diagram 400 that supports techniques for discounting extensibility latency in accordance with aspects of the present disclosure. In some examples, the latency diagram 400 may implement aspects of the system 100, the process flow 200, and the process flow 300. For example, the latency diagram 400 may be implemented at an internal service platform, an external service platform, and a client device which may be an example of the corresponding device as described with reference to FIGS. 2 and 3. In some examples, the latency diagram 400 may include features for improved reliability of performance metric determinations at the internal service platform, among other benefits.

In some examples, extensibility (e.g., an extensibility latency 410) may lead to instability in the performance of the internal service platform. For example, a time series of latency experienced at a user of the internal service platform may be relatively unstable due to extensibility (e.g., a variable latency associated with extensible resources). In some examples, the internal service platform may generate a DAG data structure to track portions (e.g., each leg) of a transaction (e.g., a request) and propagates the DAG throughout the system (e.g., propagate the DAG with the request). In such examples, the internal service platform may be capable of recording a time duration of each leg of the request. For example, the legs of the request (e.g., transaction) may be tracked through labeling time durations (e.g., time segments) in which processing of the request may be performed (e.g., at the internal service platform and an external service platform). In such an example, after processing the request, the internal service platform may sum the legs of the request (e.g., to determine an overall latency spent in the system, a client latency) and exclude (e.g., discount) a time duration (e.g., a quantity of time) spent in external service platform (e.g., spent in user-controlled extensibility, spent processing user-controlled code). In some examples, each leg of the request may be labeled with an identifier that may indicate (e.g., to the internal service platform) when to activate or deactivate (e.g., begin or end) a timer, such that time durations in which processing may be performed at an external service platform might be discounted from the client latency 405. Additionally, or alternatively, each leg of the request may be determined using telemetry information obtained at the internal service platform. The telemetry information may be associated with the request and may include respective timestamps or respective traces for each leg of the request.

In some examples, the internal service platform may use a DAG (e.g., a specialized DAG) to model a request (e.g., a login request, a network protocol request) as a trace and identify time durations (e.g., legs, segments, parts) of a client latency 405 that may be associated with extensibility latency 410 and other time durations (e.g., other legs, other segments, other parts) of the client latency 405 that may be associated with one or more server latencies 425 (e.g., a server latency 425-*a* and a server latency 425-*b*). That is, the internal service platform may use the DAG to model legs of the login request as segments (e.g., subsegments) of the client latency 405. As illustrated in the example of FIG. 4, the client latency 405 (e.g., about 1000 milliseconds (ms)) may represent a latency (e.g., a full latency, an overall latency, a request time) experienced by a user (e.g., using a client device). Additionally, or alternatively, each leg (e.g., the extensibility latency 410, the server latency 425-*a* and the server latency 425-*b*) of the request may represent (e.g., explicitly) a node in the DAG.

For example, the request may spend about two legs of the request in the server (e.g., one or more internal service platforms), which may account for a portion (e.g., about 800 ms) of the request time (e.g., an overall request time, the client latency 405). That is, portions of the client latency 405 (e.g., the request time) in which processing associated with the request may be performed at the internal service platform may be illustrated in the example of FIG. 4 as the server latency 425-*a* and the server latency 425-*b*. Additionally, or alternatively, the request may spend another leg in an extension of the server (e.g., an external service platform), which may account for another portion (e.g., about 200 ms) of the request time. That is, portions of the client latency 405 (e.g., the request time) in which processing associated with the request may be performed at the external service platform (e.g., in extensibility) may be illustrated in the example of FIG. 4 as the extensibility latency 410. As such, a server time (e.g., a time duration that may be used to calculate SLAs) may correspond to a time duration including the server latency 425-*a* and the server latency 425-*b* and may indicate a time duration (e.g., an overall quantity of time, about 800 ms) that the user request (e.g., the user via the client device) may spend in the internal service platform.

Although illustrated as a single leg of the client latency 405, the extensibility latency 410 may include multiple legs of the client latency 405. That is, the DAG may include multiple nodes corresponding to multiple time durations associated with one or multiple external service platforms (e.g., multiple instances of extensibility). Additionally, or alternatively, the server latency 425-*a* and the server latency 425-*b* may each include multiple other legs of the client latency 405. That is, the DAG may include multiple nodes corresponding to multiple time durations associated with one or multiple other internal service platforms. As such, a quantity of nodes of the DAG (e.g., a depth of the DAG, a degree of hops) may depend on the request. For example, the DAG may be dynamic and include multiple nodes (e.g., any quantity of nodes, any quantity or level of internal service platform interactions, any quantity or level of external service platform interactions). In some examples, by tracing each leg of the DAG, the internal service platform may increase an accuracy with which the internal service platform may determine performance metrics, among other possible benefits.

Figure 5:
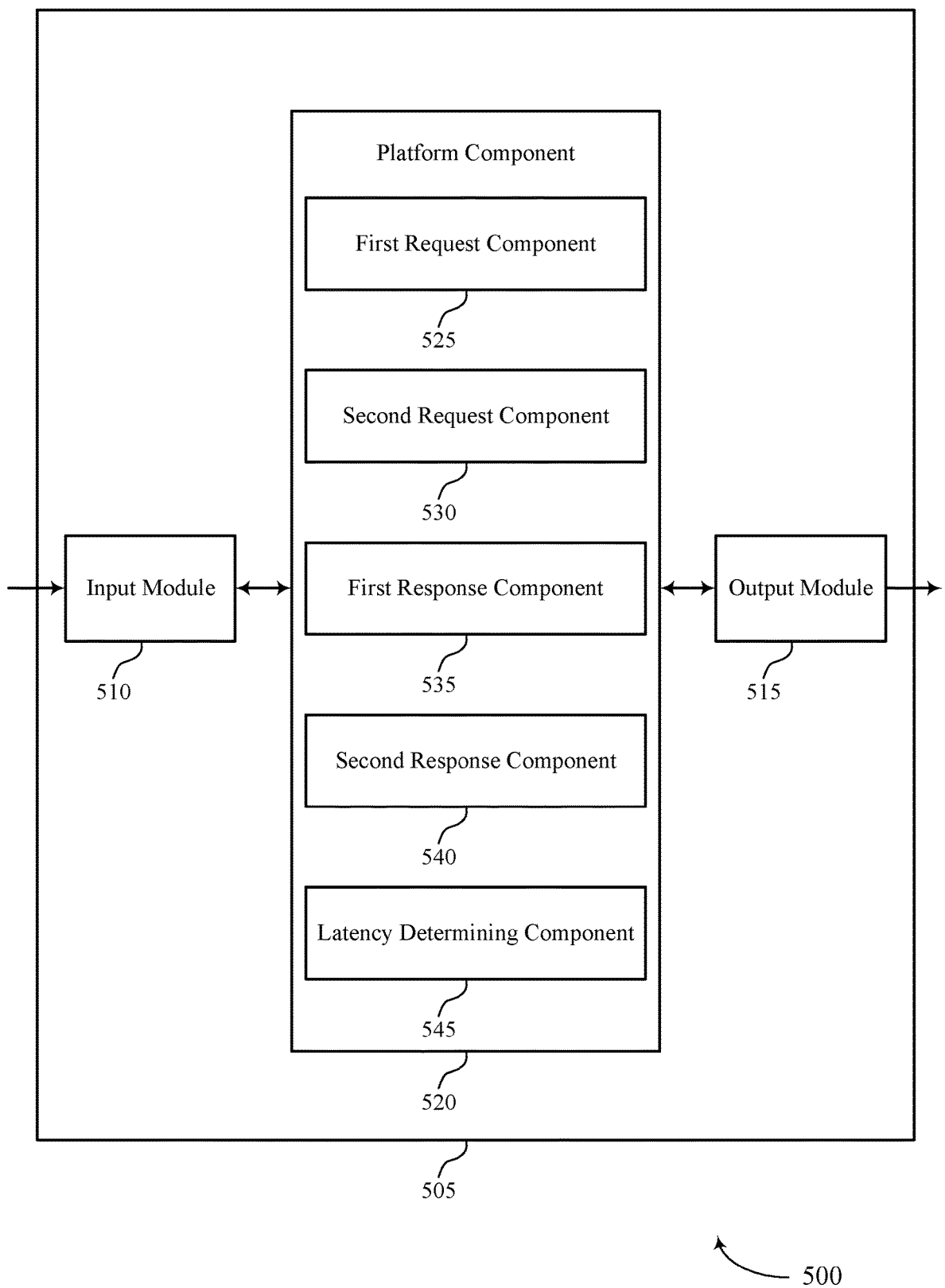
FIG. 5 shows a block diagram of an apparatus that supports techniques for discounting extensibility latency in accordance with aspects of the present disclosure.

FIG. 5 shows a block diagram 500 of a device 505 that supports techniques for discounting extensibility latency in accordance with aspects of the present disclosure. The device 505 may include an input module 510, an output module 515, and a platform component 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the platform component 520 to support techniques for discounting extensibility latency. In some cases, the input module 510 may be a component of an I/O controller 710 as described with reference to FIG. 7.

The output module 515 may manage output signals for the device 505. For example, the output module 515 may receive signals from other components of the device 505, such as the platform component 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the platform component 520 may include a first request component 525, a second request component 530, a first response component 535, a second response component 540, a latency determining component 545, or any combination thereof. Although illustrated as separate components, in some examples, any combination of the first request component 525, the second request component 530, the first response component 535, the second response component 540, and the latency determining component 545 may be implemented as a single component. In some examples, the platform component 520, or various components thereof, may be configured to perform various operations (e.g., receiving, monitoring, transmitting) using or otherwise in cooperation with the input module 510, the output module 515, or both. For example, the platform component 520 may receive information from the input module 510, send information to the output module 515, or be integrated in combination with the input module 510, the output module 515, or both to receive information, transmit information, or perform various other operations as described herein.

The platform component 520 may support measuring latency in accordance with examples as disclosed herein. The first request component 525 may be configured as or otherwise support a means for receiving, at a first service platform (e.g., the device 505), a first request to access one or more resources via the first service platform, where the first request is received at a first time instance and the one or more resources are associated with at least a second service platform. The second request component 530 may be configured as or otherwise support a means for transmitting, to the second service platform, a second request to access the one or more resources, where the second request is transmitted at a second time instance and in response to receiving the first request, where a difference between the second time instance and the first time instance includes a first time duration. The first response component 535 may be configured as or otherwise support a means for receiving, from the second service platform and after a second time duration, a first response corresponding to the second request, where the first response is received at a third time instance based on a first latency associated with the second service platform. The second response component 540 may be configured as or otherwise support a means for transmitting, at a fourth time instance and based on the first response, a second response corresponding to the first request to access the one or more resources, where a difference between the fourth time instance and the third time instance includes a third time duration. The latency determining component 545 may be configured as or otherwise support a means for determining a second latency associated with accessing the one or more resources via the first service platform based on the first time duration and the third time duration, where the second time duration is unassociated with the determination of the second latency.

Figure 6:
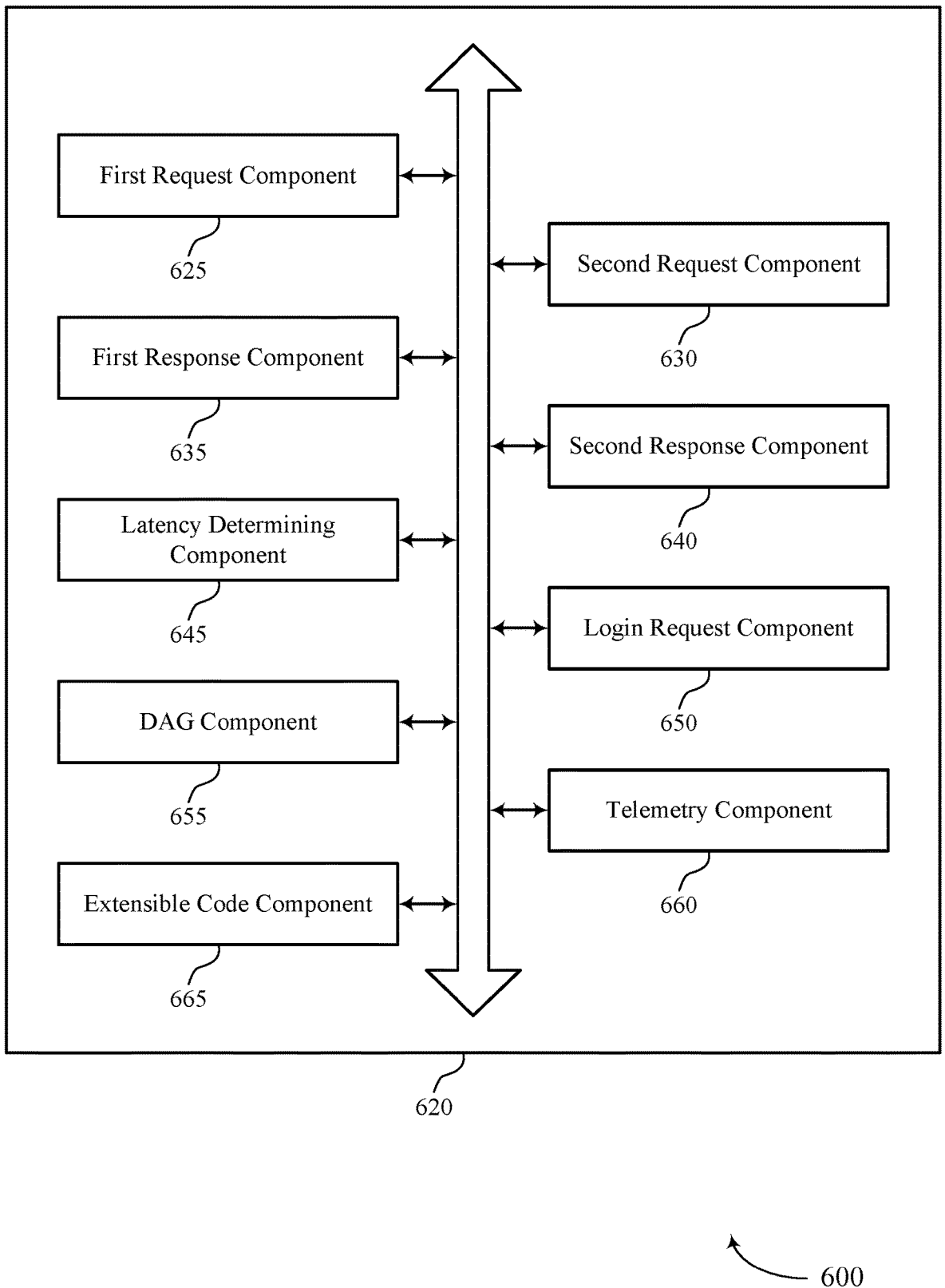
FIG. 6 shows a block diagram of a platform component that supports techniques for discounting extensibility latency in accordance with aspects of the present disclosure.

FIG. 6 shows a block diagram 600 of a platform component 620 that supports techniques for discounting extensibility latency in accordance with aspects of the present disclosure. The platform component 620 may be an example of aspects of a platform component or a platform component 520, or both, as described herein. The platform component 620, or various components thereof, may be an example of means for performing various aspects of techniques for discounting extensibility latency as described herein. For example, the platform component 620 may include a first request component 625, a second request component 630, a first response component 635, a second response component 640, a latency determining component 645, a login request component 650, a DAG component 655, a telemetry component 660, an extensible code component 665, or any combination thereof. Each of these components may communicate, directly or indirectly, with one another (e.g., via one or more buses). Although illustrated as separate components, in some examples, any combination of the first request component 625, the second request component 630, the first response component 635, the second response component 640, the latency determining component 645, the login request component 650, the DAG component 655, the telemetry component 660, and the extensible code component 665 may be implemented as a single component.

The platform component 620 may support measuring latency in accordance with examples as disclosed herein. The first request component 625 may be configured as or otherwise support a means for receiving, at a first service platform, a first request to access one or more resources via the first service platform, where the first request is received at a first time instance and the one or more resources are associated with at least a second service platform. The second request component 630 may be configured as or otherwise support a means for transmitting, to the second service platform, a second request to access the one or more resources, where the second request is transmitted at a second time instance and in response to receiving the first request, where a difference between the second time instance and the first time instance includes a first time duration. The first response component 635 may be configured as or otherwise support a means for receiving, from the second service platform and after a second time duration, a first response corresponding to the second request, where the first response is received at a third time instance based on a first latency associated with the second service platform. The second response component 640 may be configured as or otherwise support a means for transmitting, at a fourth time instance and based on the first response, a second response corresponding to the first request to access the one or more resources, where a difference between the fourth time instance and the third time instance includes a third time duration. The latency determining component 645 may be configured as or otherwise support a means for determining a second latency associated with accessing the one or more resources via the first service platform based on the first time duration and the third time duration, where the second time duration is unassociated with the determination of the second latency.

In some examples, to support receiving the first request, the login request component 650 may be configured as or otherwise support a means for receiving, at the first service platform, a login request to access extensible code via the first service platform, where the extensible code is stored in an extension of the first service platform, the second service platform including the extension of the first service platform.

In some examples, to support transmitting the second request, the extensible code component 665 may be configured as or otherwise support a means for executing the extensible code in the extension of the first service platform, where the first response is received at the third time instance based on an extensibility latency associated with the extensible code. In some examples, the login request includes a network protocol request.

In some examples, the DAG component 655 may be configured as or otherwise support a means for generating a DAG to individually identify the first time duration, the second time duration, and the third time duration, where determining the second latency is based on the identifying. In some examples, the DAG component 655 may be configured as or otherwise support a means for implementing the DAG using distributed tracing, where individually identifying the first time duration, the second time duration, and the third time duration is based on the distributed tracing. In some examples, the first time duration, the second time duration, and the third time duration each include a node of the DAG.

In some examples, to support determining the second latency, the latency determining component 645 may be configured as or otherwise support a means for determining a fourth time duration including a difference between the first time instance and the fourth time instance, where the second latency is based on a difference between the fourth time duration and the second time duration.

In some examples, to support determining the second latency, the telemetry component 660 may be configured as or otherwise support a means for obtaining telemetry information associated with accessing the one or more resources via the first service platform. In some examples, to support determining the second latency, the telemetry component 660 may be configured as or otherwise support a means for determining the first time duration and the third time duration based on the obtained telemetry information. In some examples, to support determining the second latency, the latency determining component 645 may be configured as or otherwise support a means for determining the second latency based on determining the first time duration and the third time duration.

In some examples, the telemetry information includes a respective timestamp corresponding to each of the first time instance, the second time instance, the third time instance, and the fourth time instance. In some examples, the telemetry information includes a respective trace corresponding to each of the first time duration, the second time duration, and the third time duration.

In some examples, to support receiving the first request, the first request component 625 may be configured as or otherwise support a means for receiving, at the first service platform, a request to access a set of multiple resources via the first service platform, where the request is received at the first time instance and the set of multiple resources are associated with a set of multiple service platforms.

In some examples, the set of multiple service platforms includes at least one service platform that is an extension of the first service platform and at least one other service platform that is an extension of the at least one service platform.

Figure 7:
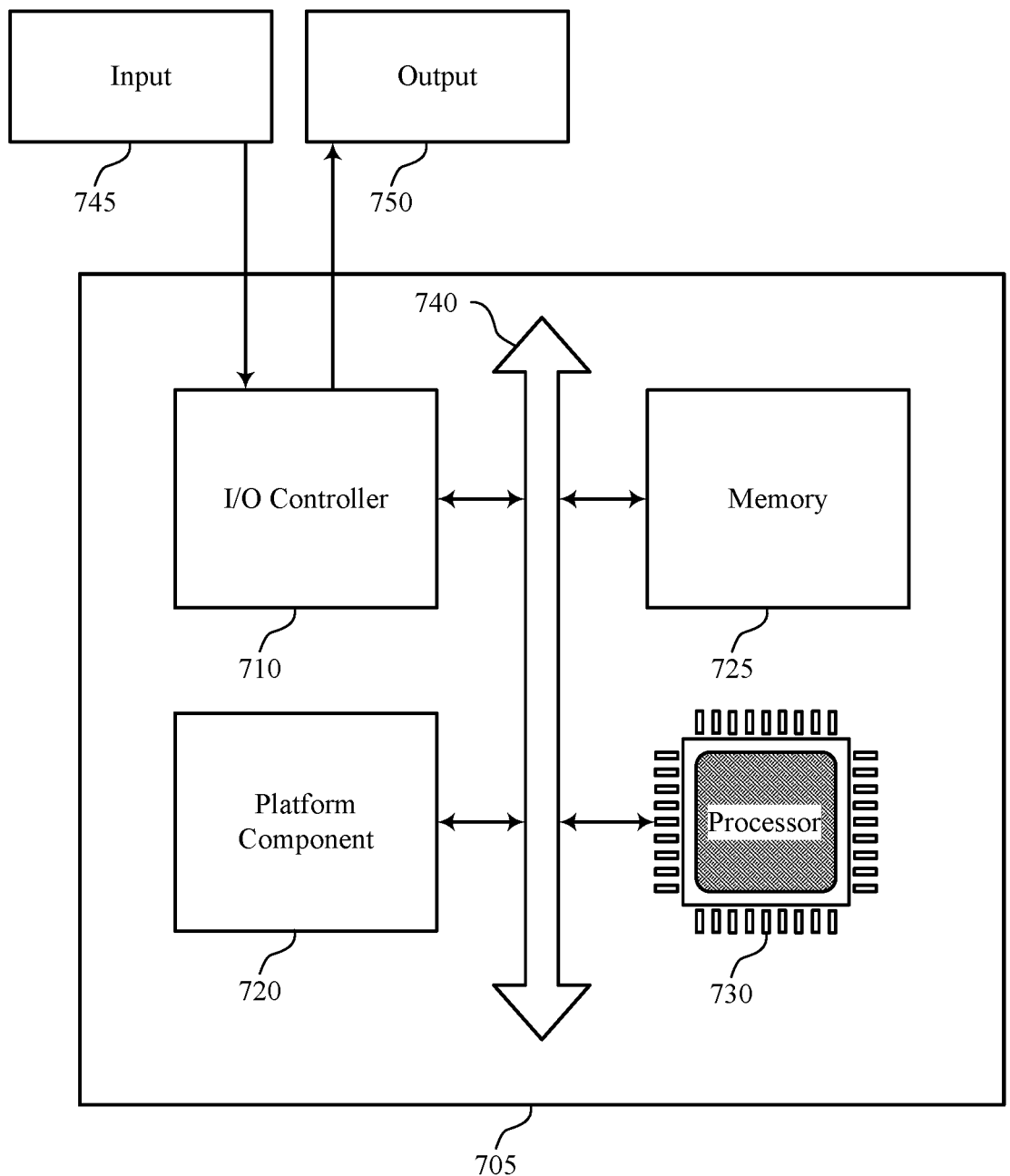
FIG. 7 shows a diagram of a system including a device that supports techniques for discounting extensibility latency in accordance with aspects of the present disclosure.

FIG. 7 shows a diagram of a system 700 including a device 705 that supports techniques for discounting extensibility latency in accordance with aspects of the present disclosure. The device 705 may be an example of or include the components of a device 505 as described herein. The device 705 may include components for bi-directional data communications including components for transmitting and receiving communications, such as a platform component 720, an I/O controller 710, a memory 725, and a processor 730. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for discounting extensibility latency).

The platform component 720 may support measuring latency in accordance with examples as disclosed herein. For example, the platform component 720 may be configured as or otherwise support a means for receiving, at a first service platform, a first request to access one or more resources via the first service platform, where the first request is received at a first time instance and the one or more resources are associated with at least a second service platform. The platform component 720 may be configured as or otherwise support a means for transmitting, to the second service platform, a second request to access the one or more resources, where the second request is transmitted at a second time instance and in response to receiving the first request, where a difference between the second time instance and the first time instance includes a first time duration. The platform component 720 may be configured as or otherwise support a means for receiving, from the second service platform and after a second time duration, a first response corresponding to the second request, where the first response is received at a third time instance based on a first latency associated with the second service platform. The platform component 720 may be configured as or otherwise support a means for transmitting, at a fourth time instance and based on the first response, a second response corresponding to the first request to access the one or more resources, where a difference between the fourth time instance and the third time instance includes a third time duration. The platform component 720 may be configured as or otherwise support a means for determining a second latency associated with accessing the one or more resources via the first service platform based on the first time duration and the third time duration, where the second time duration is unassociated with the determination of the second latency.

By including or configuring the platform component 720 in accordance with examples as described herein, the device 705 may support techniques for reduced latency and improved user experience related to reduced processing.

Figure 8:
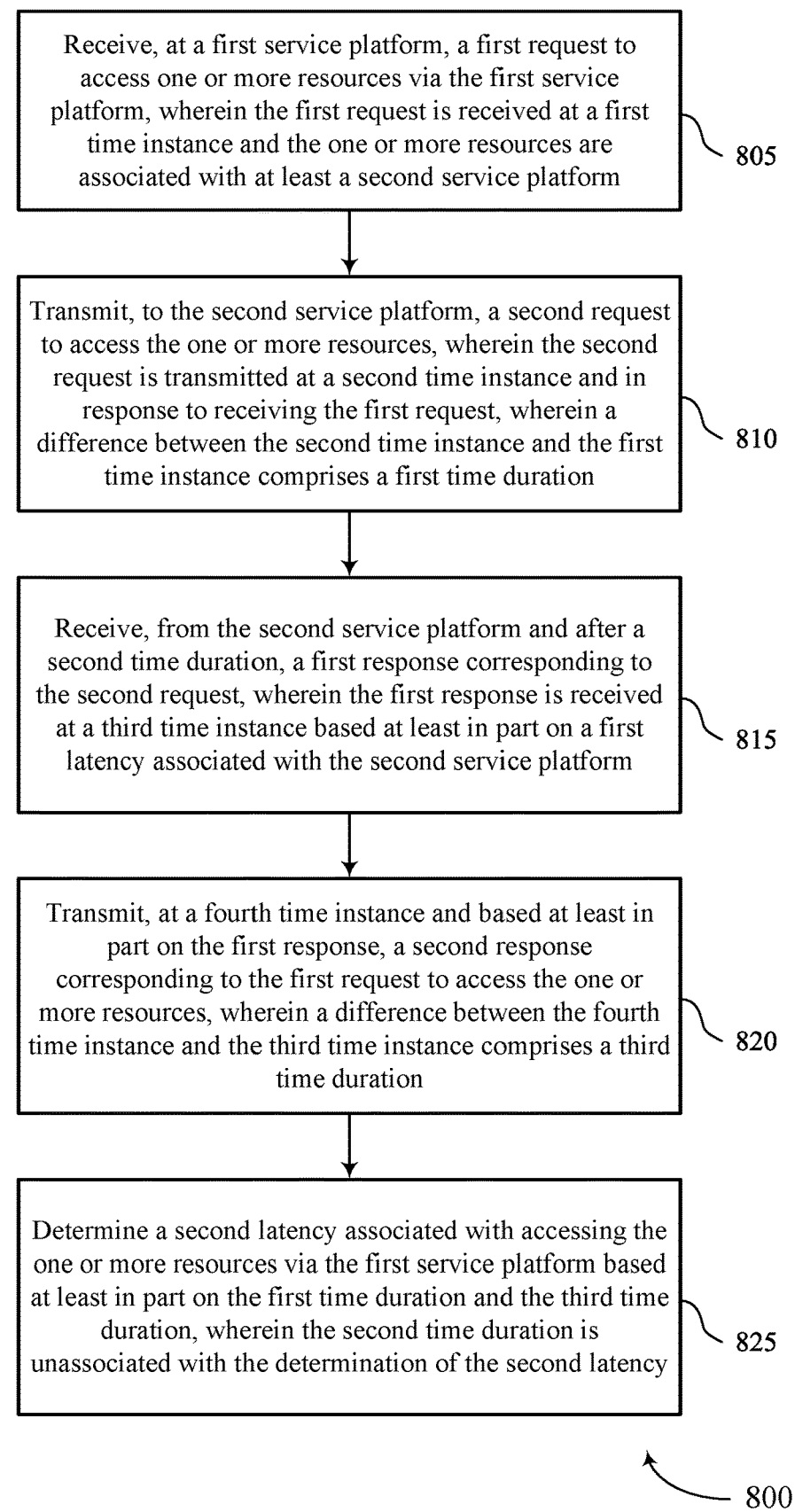
FIG. 8 shows a flowchart illustrating methods that support techniques for discounting extensibility latency in accordance with aspects of the present disclosure.

FIG. 8 shows a flowchart illustrating a method 800 that supports techniques for discounting extensibility latency in accordance with aspects of the present disclosure. The operations of the method 800 may be implemented by a device (or its components) that includes a service platform as described herein. For example, the operations of the method 800 may be performed by a client device as described with reference to FIGs. FIG. 1 through 7. In some examples, a client device may execute a set of instructions to control the functional elements of the client device to perform the described functions. Additionally, or alternatively, the client device may perform aspects of the described functions using special-purpose hardware.

At 805, the method may include receiving, at a first service platform, a first request to access one or more resources via the first service platform, where the first request is received at a first time instance and the one or more resources are associated with at least a second service platform. The operations of 805 may be performed in accordance with examples as disclosed herein. In some examples, aspects of the operations of 805 may be performed by a first request component 625 as described with reference to FIG. 6.

At 810, the method may include transmitting, to the second service platform, a second request to access the one or more resources, where the second request is transmitted at a second time instance and in response to receiving the first request, where a difference between the second time instance and the first time instance includes a first time duration. The operations of 810 may be performed in accordance with examples as disclosed herein. In some examples, aspects of the operations of 810 may be performed by a second request component 630 as described with reference to FIG. 6.

At 815, the method may include receiving, from the second service platform and after a second time duration, a first response corresponding to the second request, where the first response is received at a third time instance based on a first latency associated with the second service platform. The operations of 815 may be performed in accordance with examples as disclosed herein. In some examples, aspects of the operations of 815 may be performed by a first response component 635 as described with reference to FIG. 6.

At 820, the method may include transmitting, at a fourth time instance and based on the first response, a second response corresponding to the first request to access the one or more resources, where a difference between the fourth time instance and the third time instance includes a third time duration. The operations of 820 may be performed in accordance with examples as disclosed herein. In some examples, aspects of the operations of 820 may be performed by a second response component 640 as described with reference to FIG. 6.

At 825, the method may include determining a second latency associated with accessing the one or more resources via the first service platform based on the first time duration and the third time duration, where the second time duration is unassociated with the determination of the second latency. The operations of 825 may be performed in accordance with examples as disclosed herein. In some examples, aspects of the operations of 825 may be performed by a latency determining component 645 as described with reference to FIG. 6.

A method for measuring latency is described. The method may include receiving, at a first service platform, a first request to access one or more resources via the first service platform, where the first request is received at a first time instance and the one or more resources are associated with at least a second service platform, transmitting, to the second service platform, a second request to access the one or more resources, where the second request is transmitted at a second time instance and in response to receiving the first request, where a difference between the second time instance and the first time instance includes a first time duration, receiving, from the second service platform and after a second time duration, a first response corresponding to the second request, where the first response is received at a third time instance based on a first latency associated with the second service platform, transmitting, at a fourth time instance and based on the first response, a second response corresponding to the first request to access the one or more resources, where a difference between the fourth time instance and the third time instance includes a third time duration, and determining a second latency associated with accessing the one or more resources via the first service platform based on the first time duration and the third time duration, where the second time duration is unassociated with the determination of the second latency.

An apparatus for measuring latency is described. The apparatus may include a processor, memory coupled with the processor, and instructions stored in the memory. The instructions may be executable by the processor to cause the apparatus to receive, at a first service platform, a first request to access one or more resources via the first service platform, where the first request is received at a first time instance and the one or more resources are associated with at least a second service platform, transmit, to the second service platform, a second request to access the one or more resources, where the second request is transmitted at a second time instance and in response to receiving the first request, where a difference between the second time instance and the first time instance includes a first time duration, receive, from the second service platform and after a second time duration, a first response corresponding to the second request, where the first response is received at a third time instance based on a first latency associated with the second service platform, transmit, at a fourth time instance and based on the first response, a second response corresponding to the first request to access the one or more resources, where a difference between the fourth time instance and the third time instance includes a third time duration, and determine a second latency associated with accessing the one or more resources via the first service platform based on the first time duration and the third time duration, where the second time duration is unassociated with the determination of the second latency.

Another apparatus for measuring latency is described. The apparatus may include means for receiving, at a first service platform, a first request to access one or more resources via the first service platform, where the first request is received at a first time instance and the one or more resources are associated with at least a second service platform, means for transmitting, to the second service platform, a second request to access the one or more resources, where the second request is transmitted at a second time instance and in response to receiving the first request, where a difference between the second time instance and the first time instance includes a first time duration, means for receiving, from the second service platform and after a second time duration, a first response corresponding to the second request, where the first response is received at a third time instance based on a first latency associated with the second service platform, means for transmitting, at a fourth time instance and based on the first response, a second response corresponding to the first request to access the one or more resources, where a difference between the fourth time instance and the third time instance includes a third time duration, and means for determining a second latency associated with accessing the one or more resources via the first service platform based on the first time duration and the third time duration, where the second time duration is unassociated with the determination of the second latency.

A non-transitory computer-readable medium storing code for measuring latency is described. The code may include instructions executable by a processor to receive, at a first service platform, a first request to access one or more resources via the first service platform, where the first request is received at a first time instance and the one or more resources are associated with at least a second service platform, transmit, to the second service platform, a second request to access the one or more resources, where the second request is transmitted at a second time instance and in response to receiving the first request, where a difference between the second time instance and the first time instance includes a first time duration, receive, from the second service platform and after a second time duration, a first response corresponding to the second request, where the first response is received at a third time instance based on a first latency associated with the second service platform, transmit, at a fourth time instance and based on the first response, a second response corresponding to the first request to access the one or more resources, where a difference between the fourth time instance and the third time instance includes a third time duration, and determine a second latency associated with accessing the one or more resources via the first service platform based on the first time duration and the third time duration, where the second time duration is unassociated with the determination of the second latency.

In some examples of the method, apparatuses, and non-transitory computer-readable medium described herein, receiving the first request may include operations, features, means, or instructions for receiving, at the first service platform, a login request to access extensible code via the first service platform, where the extensible code may be stored in an extension of the first service platform, the second service platform including the extension of the first service platform.

In some examples of the method, apparatuses, and non-transitory computer-readable medium described herein, transmitting the second request may include operations, features, means, or instructions for executing the extensible code in the extension of the first service platform, where the first response may be received at the third time instance based on an extensibility latency associated with the extensible code.

In some examples of the method, apparatuses, and non-transitory computer-readable medium described herein, the login request includes a network protocol request.

Some examples of the method, apparatuses, and non-transitory computer-readable medium described herein may further include operations, features, means, or instructions for generating a DAG to individually identify the first time duration, the second time duration, and the third time duration, where determining the second latency may be based on the identifying.

Some examples of the method, apparatuses, and non-transitory computer-readable medium described herein may further include operations, features, means, or instructions for implementing the DAG using distributed tracing, where individually identifying the first time duration, the second time duration, and the third time duration may be based on the distributed tracing.

In some examples of the method, apparatuses, and non-transitory computer-readable medium described herein, the first time duration, the second time duration, and the third time duration each include a node of the DAG.

In some examples of the method, apparatuses, and non-transitory computer-readable medium described herein, determining the second latency may include operations, features, means, or instructions for determining a fourth time duration including a difference between the first time instance and the fourth time instance, where the second latency may be based on a difference between the fourth time duration and the second time duration.

In some examples of the method, apparatuses, and non-transitory computer-readable medium described herein, determining the second latency may include operations, features, means, or instructions for obtaining telemetry information associated with accessing the one or more resources via the first service platform, determining the first time duration and the third time duration based on the obtained telemetry information, and determining the second latency based on determining the first time duration and the third time duration.

In some examples of the method, apparatuses, and non-transitory computer-readable medium described herein, the telemetry information includes a respective timestamp corresponding to each of the first time instance, the second time instance, the third time instance, and the fourth time instance.

In some examples of the method, apparatuses, and non-transitory computer-readable medium described herein, the telemetry information includes a respective trace corresponding to each of the first time duration, the second time duration, and the third time duration.

In some examples of the method, apparatuses, and non-transitory computer-readable medium described herein, receiving the first request may include operations, features, means, or instructions for receiving, at the first service platform, a request to access a set of multiple resources via the first service platform, where the request may be received at the first time instance and the set of multiple resources may be associated with a set of multiple service platforms.

In some examples of the method, apparatuses, and non-transitory computer-readable medium described herein, the set of multiple service platforms includes at least one service platform that may be an extension of the first service platform and at least one other service platform that may be an extension of the at least one service platform.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for measuring latency at a first service platform, comprising:
   receiving, at the first service platform and from a client device, a first request to access one or more resources via the first service platform, wherein the first request is received at a first time instance and the one or more resources are associated with at least a second service platform;
   transmitting, to the second service platform, a second request to access the one or more resources, wherein the second request is transmitted at a second time instance and in response to receiving the first request, wherein a difference between the second time instance and the first time instance comprises a first time duration;
   receiving, at the first service platform and from the second service platform and at a third time instance, a first response in response to the second request, wherein a difference between the second time instance and the third time instance comprises a second time duration corresponding to a first latency associated with the second service platform;
   transmitting, to the client device and at a fourth time instance and based at least in part on the first response, a second response corresponding to the first request to access the one or more resources, wherein a difference between the fourth time instance and the third time instance comprises a third time duration; and
   determining a second latency associated with accessing the one or more resources via the first service platform based at least in part on the first time duration and the third time duration, wherein the second time duration is excluded from the determination of the second latency based at least in part on the second time duration comprising the first latency associated with the second service platform.

2. The method of claim 1, wherein receiving the first request comprises:
   receiving, at the first service platform, a login request to access extensible code via the first service platform, wherein the extensible code is stored in an extension of the first service platform, the second service platform comprising the extension of the first service platform.

3. The method of claim 2, wherein transmitting the second request comprises:
   executing the extensible code in the extension of the first service platform, wherein the first response is received at the third time instance based at least in part on an extensibility latency associated with the extensible code.

4. The method of claim 2, wherein the login request comprises a network protocol request.

5. The method of claim 1, further comprising:
   generating a directed acyclic graph to individually identify the first time duration, the second time duration, and the third time duration, wherein determining the second latency is based at least in part on the identifying.

6. The method of claim 5, further comprising:
   implementing the directed acyclic graph using distributed tracing, wherein individually identifying the first time duration, the second time duration, and the third time duration is based at least in part on the distributed tracing.

7. The method of claim 5, wherein the first time duration, the second time duration, and the third time duration each comprise a node of the directed acyclic graph.

8. The method of claim 1, wherein determining the second latency comprises:
   determining a fourth time duration comprising a difference between the first time instance and the fourth time instance, wherein the second latency is based at least in part on a difference between the fourth time duration and the second time duration.

9. The method of claim 1, wherein determining the second latency comprises:
   obtaining telemetry information associated with accessing the one or more resources via the first service platform;
   determining the first time duration and the third time duration based at least in part on the obtained telemetry information; and
   determining the second latency based at least in part on determining the first time duration and the third time duration.

10. The method of claim 9, wherein the telemetry information comprises a respective timestamp corresponding to each of the first time instance, the second time instance, the third time instance, and the fourth time instance.

11. The method of claim 9, wherein the telemetry information comprises a respective trace corresponding to each of the first time duration, the second time duration, and the third time duration.

12. The method of claim 1, wherein receiving the first request comprises:
receiving, at the first service platform, a request to access a plurality of resources via the first service platform, wherein the request is received at the first time instance and the plurality of resources are associated with a plurality of service platforms.

13. The method of claim 12, wherein the plurality of service platforms comprises at least one service platform that is an extension of the first service platform and at least one other service platform that is an extension of the at least one service platform.

14. An apparatus for measuring latency at a first service platform, comprising:
a processor;
memory coupled with the processor; and
instructions stored in the memory and executable by the processor to cause the apparatus to:
receive, at the first service platform and from a client device, a first request to access one or more resources via the first service platform, wherein the first request is received at a first time instance and the one or more resources are associated with at least a second service platform;
transmit, to the second service platform, a second request to access the one or more resources, wherein the second request is transmitted at a second time instance and in response to receiving the first request, wherein a difference between the second time instance and the first time instance comprises a first time duration;
receive, at the first service platform and from the second service platform and at a third time instance, a first response in response to the second request, wherein a difference between the second time instance and the third time instance comprises a second time duration corresponding to a first latency associated with the second service platform;
transmit, to the client device and at a fourth time instance and based at least in part on the first response, a second response corresponding to the first request to access the one or more resources, wherein a difference between the fourth time instance and the third time instance comprises a third time duration; and
determine a second latency associated with accessing the one or more resources via the first service platform based at least in part on the first time duration and the third time duration, wherein the second time duration is excluded from the determination of the second latency based at least in part on the second time duration comprising the first latency associated with the second service platform.

15. The apparatus of claim 14, wherein the instructions to receive the first request are executable by the processor to cause the apparatus to:
receive, at the first service platform, a login request to access extensible code via the first service platform, wherein the extensible code is stored in an extension of the first service platform, the second service platform comprising the extension of the first service platform.

16. The apparatus of claim 14, wherein the instructions are further executable by the processor to cause the apparatus to:
generate a directed acyclic graph to individually identify the first time duration, the second time duration, and the third time duration, wherein determining the second latency is based at least in part on the identifying.

17. The apparatus of claim 14, wherein the instructions to determine the second latency are executable by the processor to cause the apparatus to:
determine a fourth time duration comprising a difference between the first time instance and the fourth time instance, wherein the second latency is based at least in part on a difference between the fourth time duration and the second time duration.

18. A non-transitory computer-readable medium storing code for measuring latency at a first service platform, the code comprising instructions executable by a processor to:
receive, at the first service platform and from a client device, a first request to access one or more resources via the first service platform, wherein the first request is received at a first time instance and the one or more resources are associated with at least a second service platform;
transmit, to the second service platform, a second request to access the one or more resources, wherein the second request is transmitted at a second time instance and in response to receiving the first request, wherein a difference between the second time instance and the first time instance comprises a first time duration;
receive, at the first service platform and from the second service platform and at a third time instance, a first response in response to the second request, wherein a difference between the second time instance and the third time instance comprises a second time duration corresponding to a first latency associated with the second service platform;
transmit, to the client device and at a fourth time instance and based at least in part on the first response, a second response corresponding to the first request to access the one or more resources, wherein a difference between the fourth time instance and the third time instance comprises a third time duration; and
determine a second latency associated with accessing the one or more resources via the first service platform based at least in part on the first time duration and the third time duration, wherein the second time duration is excluded from the determination of the second latency based at least in part on the second time duration comprising the first latency associated with the second service platform.

19. The non-transitory computer-readable medium of claim 18, wherein the instructions to receive the first request are executable by the processor to:
receive, at the first service platform, a login request to access extensible code via the first service platform, wherein the extensible code is stored in an extension of the first service platform, the second service platform comprising the extension of the first service platform.

20. The non-transitory computer-readable medium of claim 19, wherein the instructions to transmit the second request are executable by the processor to:
execute the extensible code in the extension of the first service platform, wherein the first response is received at the third time instance based at least in part on an extensibility latency associated with the extensible code.

\* \* \* \* \*